United States Patent [19]
Elder, Jr. et al.

[11] Patent Number: 5,227,620
[45] Date of Patent: Jul. 13, 1993

[54] APPARATUS FOR ASSEMBLING COMPONENTS OF COLOR OPTICAL SCANNERS

[75] Inventors: C. William Elder, Jr., Greeley; Michael J. Steinle, Fort Collins; Duane L. Starner, Windsor, all of Colo.

[73] Assignee: Hewlett-Packard Company, Palo Alto, Calif.

[21] Appl. No.: 906,144

[22] Filed: Jun. 29, 1992

[51] Int. Cl.[5] .............................. H01J 40/14
[52] U.S. Cl. ................................ 250/208; 250/226
[58] Field of Search ............... 250/201.8, 208.1, 226; 358/482, 483, 75, 80; 356/406, 419; 359/588, 589, 590; 355/32, 326, 327

[56] References Cited

U.S. PATENT DOCUMENTS

| | | |
|---|---|---|
| 4,870,268 | 9/1989 | Vincent et al. |
| 4,926,041 | 5/1990 | Boyd . |
| 4,988,203 | 1/1991 | Vriens et al. ........................ 359/589 |
| 5,019,703 | 5/1991 | Boyd et al. . |
| 5,032,004 | 7/1991 | Steinle . |
| 5,040,872 | 8/1991 | Steinle . |
| 5,044,727 | 9/1991 | Steinle . |
| 5,124,547 | 6/1992 | Melman ............................ 250/226 |

*Primary Examiner*—David C. Nelms
*Assistant Examiner*—K. Shami

[57] ABSTRACT

An apparatus for assembling components of a color optical scanner subassembly which includes a first filter member, a second filter member and a photosensor unit. The apparatus includes an imaging means for impinging an imaging light beam from a line object onto the first and second filter assemblies for producing spatially separated color component images of the line object on the photosensor unit. The apparatus also includes a physical adjustment assembly for holding and selectively adjusting the relative position of the first filter member, the second filter member and the photosensor unit in response to data signals generated by the photosensor unit. This positioning accurately locates the filter members relative to the photosensor unit for optimizing performance of the color optical scanner.

17 Claims, 7 Drawing Sheets

APPARATUS FOR ASSEMBLING COMPONENTS OF COLOR OPTICAL SCANNERS

BACKGROUND OF THE INVENTION

The present invention relates generally to optical scanners and, more particularly, to an apparatus for assembling components of color optical scanners.

Optical scanners are used to produce machine-readable data which is representative of a scanned object, e.g. a page of printed text. Optical scanners employ line-focus systems to image scanned objects.

In a line-focus system, a light beam from an illuminated line object is imaged by a lens on a linear photosensor array which is positioned remotely from the line object. The linear photosensor array is a single dimension array of photoelements which correspond to small area locations on the line object. These small area locations on the line object are commonly referred to as "picture elements" or "pixels." In response to light from its corresponding pixel location on the line object, each photosensor pixel element in the linear photosensor array (sometimes referred to simply as "pixels") produces a data signal which is representative of the light intensity which it experiences. All of the photoelement data signals are received and processed by an appropriate data processing system.

In a color optical scanner, a plurality of spectrally separated imaging beams (typically red, green and blue beams) must be projected onto photosensor arrays. Some color optical scanners employ beam splitter devices for spectrally separating an imaging light beam into color component beams. These separate color component beams are projected onto separate linear photosensor arrays.

FIG. 1 is a schematic diagram showing a cut away view of a lens assembly, a trichromatic beamsplitter device, and a three-line photosensor array of an optical scanner. As shown in FIG. 1, an input polychromatic imaging beam 12 is focused by a lens 14 which is held by a lens holder 16 capable of focusing the lens very precisely on the detector surface of a three-line CCD array 18. Input beam 12 impinges upon the optical surfaces of an optical separator assembly 10 and is separated into three predetermined colors to form three optical beams having predetermined spectral ranges that are carefully selected by dichroic layers 21, 23, 25, 27, 29, 31 placed on optical surfaces of the optical separator 10.

As shown on FIG. 1, a lower dichroic layer device or filter member 20 of separator 10 is disposed such that the angle of incidence of the optical axis of input beam 12 is approximately 22.5°. Input beam 12 is split by filter member 20 into three spatially and spectrally separated beams that are transmitted to an upper dichroic layer device or filter member 22 which is also disposed at approximately 22.5° to the optical axes of each of the spatially and spectrally separated optical beams. The upper dichroic layer device 22 is normally constructed in the same manner as the first dichroic layer device 20 but with the order of the dichroic layers reversed so that the three separate optical beams that are transmitted from the second dichroic layer device have equal optical path lengths to a predetermined image plane. For example, device 20 may have equally separated red, green, and blue reflective layers 21, 23, and 25 and device 22 may have red, green, and blue reflective layers 27, 29 and 31 which are separated by the same distance as the layers of device 20.

The detector device 18 is disposed on an image plane that is substantially normal to the optical axes of the separated input beams which are focused thereon. Each of the three spatially and spectrally separated optical beams is focused on a separate line detector array 33, 35, 37 (which are shown in cross-section in FIG. 1 and thus appear as points) on detector 18 so that a line scan of, for example, a document results in each of the colors from the line scan being detected simultaneously on the detector surface of detector 18 as a result of the equal optical path lengths of each of the individual spectrally separated beams.

The dichroic layer devices 20 and 22 are precisely held in the positions illustrated by a mounting device 24 that includes arm structures 28 and 30 that extend between two side portions. The mounting device 24 is open in the central portions to allow light to be transmitted to the optical component 10 and subsequently to detector 18. Detector 18 is also precisely located in the mounting device 24 by way of interface surfaces 32 and 34. Signals derived from detector 18 are fed directly to circuit board 36 via connectors 38 and 40 that comprise a plurality of connectors.

The construction and operation of color optical scanners employing beam splitter assemblies and photosensor arrays such as described above with reference to FIG. 1 are fully disclosed in the following United States patents which are all hereby specifically incorporated by reference for all that is disclosed therein: U.S. Pat. No. 4,870,268 of Vincent et al. for COLOR COMBINER AND SEPARATOR AND IMPLEMENTATIONS; U.S. Pat. No. 4,926,041 of Boyd for OPTICAL SCANNER; U.S. Pat. No. 5,019,703 of Boyd et al. for OPTICAL SCANNER WITH MIRROR MOUNTED OCCLUDING APERTURE OR FILTER; U.S. Pat. No. 5,032,004 of Steinle for BEAM SPLITTER APPARATUS WITH ADJUSTABLE IMAGE FOCUS AND REGISTRATION; U.S. Pat. No. 5,044,727 of Steinle for BEAM SPLITTER/COMBINER APPARATUS; and U.S. Pat. No. 5,040,872 of Steinle for BEAM SPLITTER/COMBINER WITH PATH LENGTH COMPENSATOR.

In assembling optical scanners of the type which employ beam splitter devices (filter members) such as described above, it is imperative that the filter members 20, 22 be accurately positioned with respect to each other and with respect to the associated photosensor unit 18. Misalignment of these components can produce multiple types of error in the output of an optical scanner in which the components are mounted. Such error includes image registration error (centering, spacing, and alignment error), focus symmetry error, and color registration error.

The alignment task is complex due to the multiple axes about which the filter members must be accurately located in order to be properly positioned with respect to an associated photosensor array. The task is further complicated by the fact that it must be accomplished relatively quickly if the associated scanner is to be a mass-produced product.

SUMMARY OF THE INVENTION

The present invention is directed to a method and apparatus which enables rapid and accurate alignment and attachment of two filter members and a photosensor unit of a color optical scanner. Rather than measuring the relative physical position of these different components and seeking to achieve alignment through use of such measured dimensions, the method and apparatus of the present invention utilizes data output of the photosensor unit itself to determine component alignment accuracy.

The apparatus of the invention includes an imaging assembly which generates a line image of a target object. The apparatus also includes multiple independently moveable assemblies which are adapted to move the filter members and photosensor unit rotationally and translationally relative to each other.

Prior to being mounted in the apparatus, the photosensor unit is fixedly mounted within a support member. The support member has upwardly extending wing portions. The wing portions are adapted to be bonded to end portions of the filter members to hold the filter members in fixed position relative to the photosensor unit. (However, at the time that the photosensor component is initially mounted on the apparatus, the filter members are not attached.)

To set up the apparatus prior to beginning the adjustment process, an assembly including the support member and attached photosensor unit is mounted on the apparatus.

Separate vacuum-supplied members of the adjustment apparatus having suction ports provided therein are located near the position in the apparatus where the assembly is mounted. These vacuum-supplied members are adapted to hold the two filter members in selectively displaceable relationship with respect to each other and with respect to the photosensor unit. The filter members may be placed on these vacuum holding portions of the apparatus by hand after the photosensor unit has been mounted in the adjustment apparatus. The filter members are placed on the vacuum-supplied members at a location between the two wing portions of the support member with end portions of the filter members positioned adjacent to the wing portions of the support member.

After the filter members have been hand-mounted on the vacuum-supplied members of the apparatus, the adjustment process is initiated.

An imaging light beam from a line object of a selected target is impinged on the lower filter assembly which separates it into color component beams that are impinged onto the upper filter member and thereafter onto the linear arrays of the photosensor unit. Color component images of the line object are thus projected onto the photosensor unit. The photosensor unit generates data signals in response to the color component line images projected thereon. These data signals are transmitted to a computer. The computer processes the data signal to derive information indicative of a selected parameter and issues control commands to one or more motors on the apparatus to produce relative movement of the filter member(s) with respect to the photosensor component to bring the selected parameter to within a predetermined acceptable value. This basic process is repeated several times in a series of adjustment steps involving different parameters.

The different adjustment steps are performed in a predetermined sequence. Different target objects are used for different adjustment steps depending upon the parameter which is to be monitored and used as the basis for a particular adjustment. For example, in order to monitor and adjust for skew between the projected line images and linear photosensor arrays, a white target object is used.

The apparatus adjusts line image/photosensor registration (skew, centering, and spacing of images relative linear sensor arrays), focus symmetry, and color registration.

After all adjustments have been completed, a drop of adhesive is applied to the end of each filter member and is UV-cured to fixedly bond the filter member to the support member.

Thus, the invention may comprise an apparatus for assembling components of a color optical scanner subassembly which includes a first filter member, a second filter member and a photosensor unit. The apparatus includes an imaging means for impinging an imaging light beam from a line object onto the first and second filter assemblies for producing spatially separated color component images of the line object on the photosensor unit. The apparatus also includes a physical adjustment assembly for holding and selectively adjusting the relative position of the first filter member, the second filter member and the photosensor unit in response to data signals generated by the photosensor unit. This positioning accurately locates the filter members relative to the photosensor unit for optimizing performance of the color optical scanner.

The invention may further comprise a method for adjusting the relationship between components of a color optical scanner subassembly comprising first and second laterally extending composite filter members and a photosensor unit having a plurality of parallel, laterally extending, linear photosensor arrays provided in a common image plane thereon, prior to assembly of the optical scanner, comprising the steps of: (a) positioning the composite filter members and photosensor unit in nominal operational alignment; (b) operably connecting the photosensor arrays to a computer adapted to receive and process data signals therefrom; (c) impinging an imaging light beam of a line object onto the first filter member at an orientation so as to impinge separated component beams onto the second filter member and so as to project color component line images onto the photosensor array and (d) relatively displacing the first and second laterally extending composite filter members and photosensor unit based upon commands generated by the computer in response to the data signals received from the photosensor arrays.

DETAILED DESCRIPTION OF THE INVENTION

IN GENERAL

Figure 2:
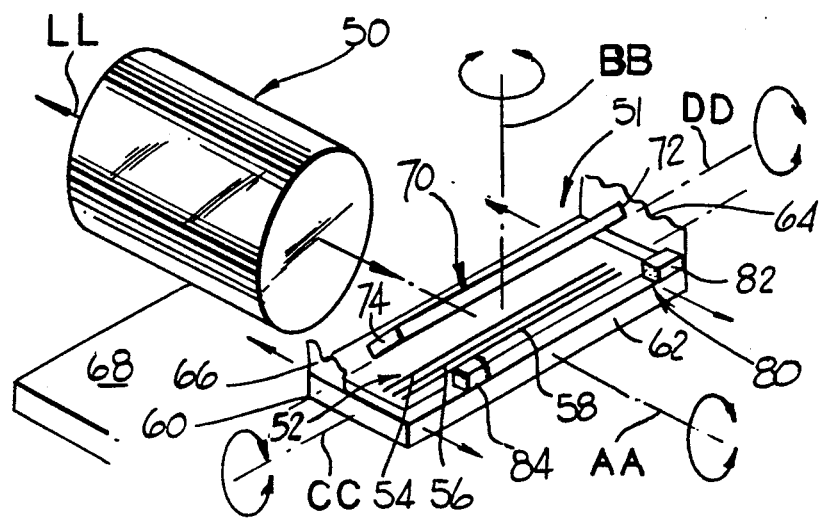
FIG. 2 is a schematic perspective view of a lens assembly and a filter member/photosensor subassembly of a color optical scanner illustrating the various axes of displacement which are manipulated by the adjustment apparatus.

FIG. 2 is a schematic drawing showing the various displacements performed by an adjustment apparatus 100 which is illustrated in FIGS. 3-6. As illustrated in FIG. 2, an imaging lens assembly 50 is displaceable in a direction parallel to its central longitudinal lens axis LL. The lens assembly 50 is adapted to provide a line image of an object in the same manner as the lens assembly of the optical scanner described in U.S. Pat. No. 4,926,041 of Boyd et al. which is hereby specifically incorporated by reference for all that it discloses.

The imaging lens assembly 50 is longitudinally displaceable relative to a beam splitter and optical sensor assembly 51. Assembly 51 comprises a three-line photosensor unit 52 which includes a first linear photosensor array 54, a second linear photosensor array 56, and a third linear photosensor array 58, which in one preferred embodiment comprise conventional CCD arrays positioned in a common plane. Sensor assembly 51 may be of the type sold under the product designation TCD-137C by Toshiba Corp. of Irvine, Calif. The linear photosensor arrays may each comprise a width of 8 microns, and may be spaced apart a distance of 200 microns between centerlines. In one embodiment of the invention, the first linear photosensor array 54 is associated with blue light, the second linear photosensor array 56 is associated with green light, and the third linear photosensor array 58 is associated with red light.

The filter support member 60 is fixedly positioned on the three-line photosensor array 52. The support member 60 may comprise a parallelepiped-shaped, generally horizontally disposed base portion 62 and two generally vertically upwardly extending wing portions 64, 66 (shown being broken away in FIG. 2).

Figure 1:
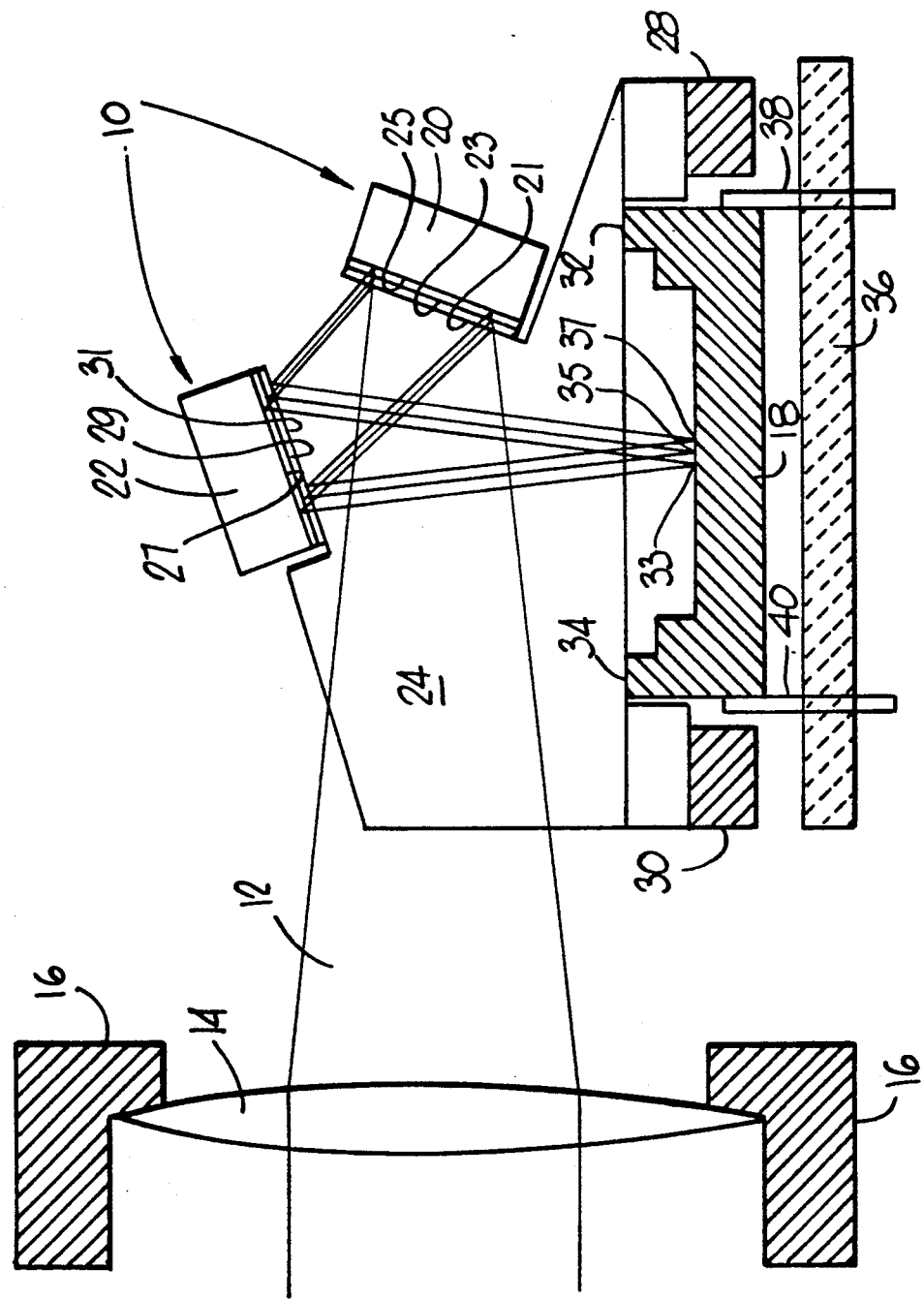
FIG. 1 is a schematic cross sectional elevation view of a lens assembly and beamsplitter (filter member)/photosensor assembly of a color optical scanner.

A top filter member 70, corresponding to filter member 22 in FIG. 1 described above, comprises a first end 72 which is adapted to be attached to wing portion 64, and a second end 74 which is adapted to be attached to wing portion 66 by a light-curing adhesive, which is applied after position adjustment and cured by apparatus 100.

A bottom filter member 80 is provided which corresponds generally to filter member 20 in the beam splitter apparatus described above with reference to FIG. 1. The bottom filter member comprises a first end 82 adapted to be attached to first wing portion 64, and a second end 84 adapted to be attached to wing portion 66.

Support member 60 is fixedly attached to a circuit board 68 sometimes referred to herein as a "retina board." Circuit board 68 corresponds to board 36 in FIG. 1 and may comprise conventional circuitry for filtering and amplifying the analog data signal from a CCD array. This signal is provided to an electrically connected controller board 67, FIG. 14 (which may correspond to the controller board of a scanner in which the sensor assembly is ultimately mounted). For example, the controller board may be the same as that provided in the HP Scanjet IIC which is commercially available from the Hewlett-Packard Company. The controller board 67 provides A/D conversion of an analog signal from the retina board and also provides interfacing circuitry used to provide a "handshake" with a personal computer 250, FIG. 14. The controller board 67 preferably also provides certain signal filtering and/or control system logic which may alternatively be provided by computer 250 software.

Apparatus 100 illustrated in FIGS. 3-6 is adapted to provide relative displacement of components linearly (translationally) and rotationally (pivotally) along and about a number of different axes. The bottom filter member 80 remains stationary during the adjustment process.

Apparatus 100 enables translational displacement of lens assembly 50 along central longitudinal lens axis LL. It enables translational displacement of three-line photosensor unit 52 in a longitudinal machine direction parallel to axis LL. The apparatus 100 also enables rolling displacement of the sensor unit 52 about a roll axis AA extending generally parallel to axis LL. The apparatus also enables rotational displacement of the sensor unit about a generally vertically extending (yaw) axis BB which intersects axis AA at the middle of central linear photosensor array 56. The apparatus 100 also enables displacement of the sensor unit 52 about a laterally extending (pitch) axis CC which extends generally coaxially with the second linear photosensor array 56 and which intersects axes AA and BB at a common point and is perpendicular to each.

The apparatus 100 also enables rotation of top filter member 70 about a top filter pitch axis DD extending perpendicular to axis LL and lying in the same plane as the outermost reflective layer of the top filter member 70. However, top filter member 70 remains longitudinally stationary during the adjustment process.

Figure 14:
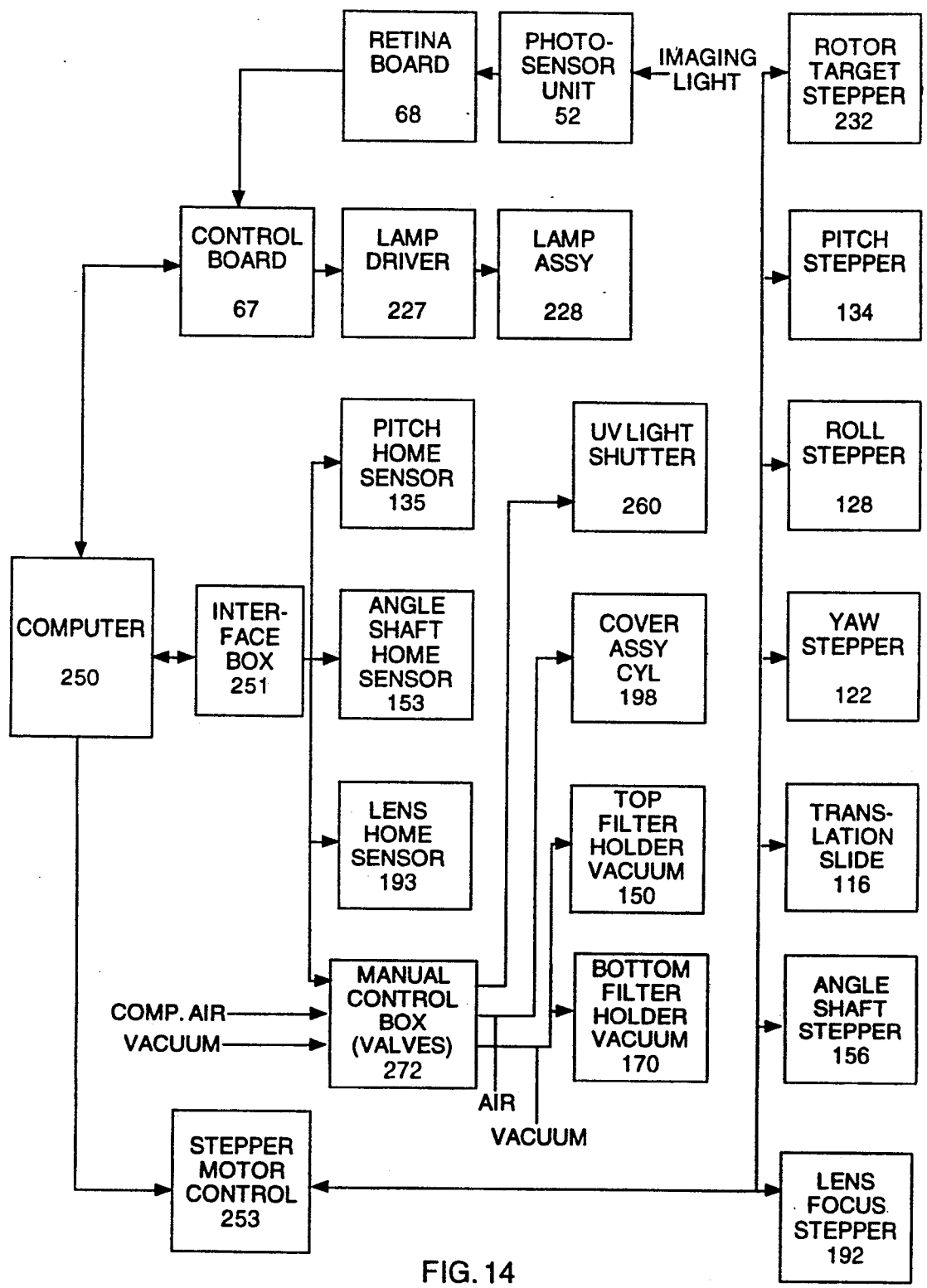
FIG. 14 is a schematic drawing illustrating a control system for the apparatus of FIG. 3.

The apparatus 100 includes a digital computer 250, FIG. 14, which is electronically connected through controller board 67 to circuit (retina) board 68 such that data indicative of the intensity of light striking each pixel element of the three-line photosensor unit 52 is transmitted to the computer 250 for processing. The computer processes data from the photosensors produced by light reflected from a series of selected target objects, FIGS. 7-10, in order to determine the relative displacement which is required to position the filter members 70, 80 in proper alignment position with respect to the three-line photosensor unit 52. The computer 250 issues a series of commands to various stepper motors to produce relative displacement of the filter members and sensor unit 52 to provide proper positioning. After these adjustments are completed, the filter members are fixedly secured to support member 60 in which the three-line photosensor unit 52 is fixedly mounted. After the filter members are thus secured, the beam splitter, optical sensor, and circuit board subassembly is removed from the apparatus 100 and is ready for assembly with other components of a color optical scanner.

STRUCTURAL FEATURES OF ADJUSTMENT APPARATUS

Various structural components of apparatus 100 will now be described with reference to FIGS. 3–6. A rigid base plate 110 which may comprise a cast iron block having a length of 24 inches, a width of 18 inches, and a height of 4 inches provides a base for other components of the apparatus. A translation base plate 112 is fixedly mounted on main base plate 110 and translationally supports a translation slide plate 114 thereon. Slide plate 114 is translationally displaceable in a longitudinal direction parallel to lens axis LL by a translation stepper motor 116.

A yaw stage assembly 120 is rotatably mounted on translation slide member 114 and is rotatable relative thereto about yaw axis BB by associated yaw stage stepper motor 122. Yaw axis BB intersects the photosensor unit 52 at the center of center array 56 and is perpendicular thereto.

A roll stage bracket 124 is fixedly attached to yaw stage 120. A roll stage 126 is rotationally mounted on roll stage bracket 124 and is pivotable about roll axis AA extending generally parallel to axis LL and passing through the common plane of the linear photosensor arrays. Axis AA intersects axis BB in the plane of the photosensor arrays. A roll stage stepper motor 128 is operably associated with the roll stage for rotating it about axis AA.

A pitch bracket 130 is fixedly attached to roll stage 126 and defines pitch axis CC. Axis CC intersects axes AA and BB at their point of intersection at the center of the photosensor array and extends laterally, perpendicular to AA and BB. A board holder 132 is rotationally mounted on pitch bracket 130. A pitch stepper motor 134 is operably associated with the board holder for rotating it relative to pitch bracket 130 about pitch axis CC.

As previously mentioned, a circuit board 68 sometimes referred to as a retina board is fixedly attached to the sensor unit which is attached to the CCD/filter support member 60 prior to insertion of the support member 60 into the adjustment apparatus 100. The retina board, attached photosensor unit 52, and attached support member 60 are the components which are initially mounted on adjustment apparatus 100. The retina board 68 has a conventional electronic data transmission cable (not shown) attached thereto which is adapted to transmit electronic data generated by the linear photosensor arrays 54, 56, 58 to a controller board 67. During the adjustment operations performed by apparatus 100, the controller board 67 output is sent to a personal computer 250 which is used to calculate needed displacements and issue appropriate commands to the various stepper motors of apparatus 100 as will be described in further detail below.

Figure 5:
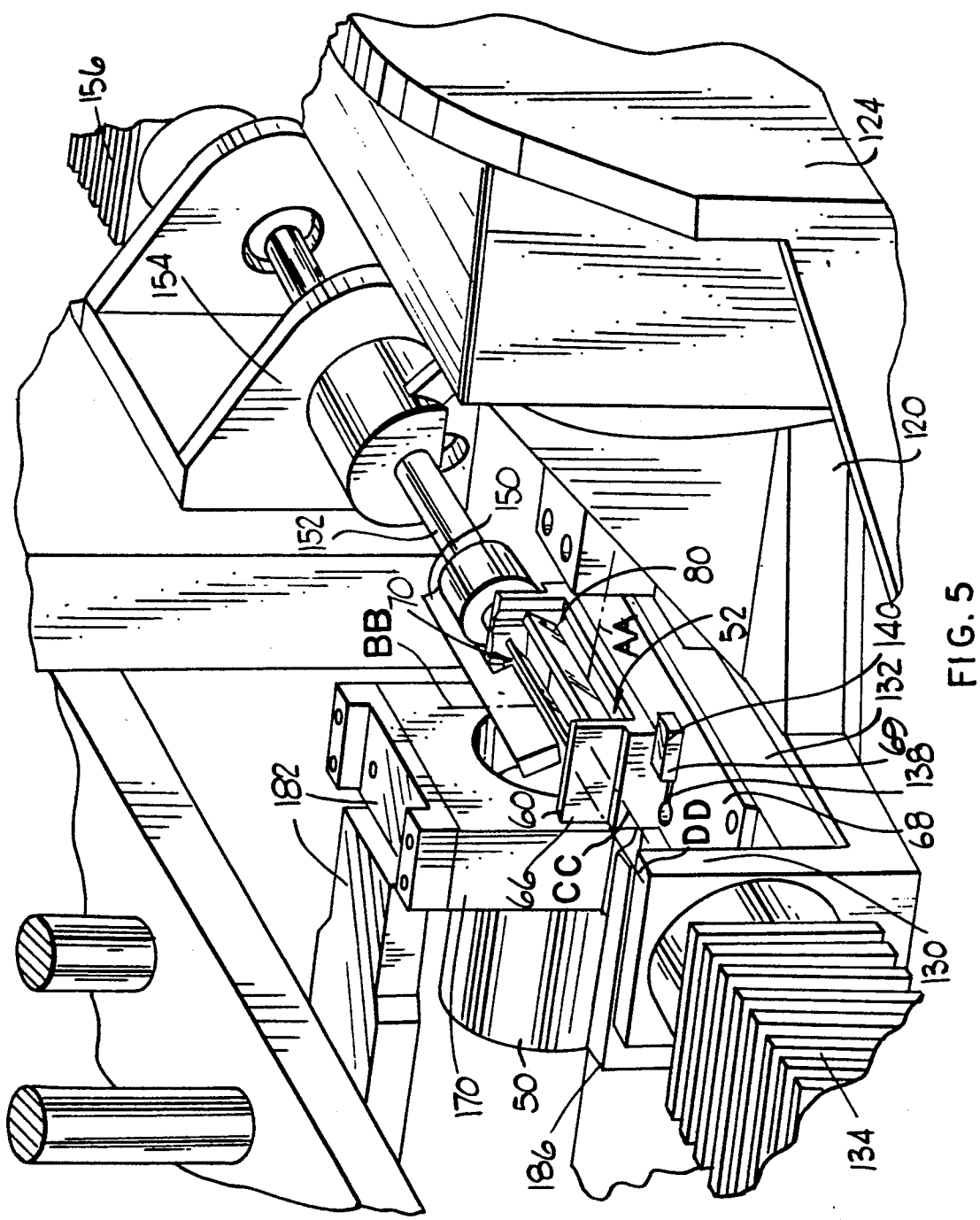
FIG. 5 is another detail perspective view of the apparatus of FIG. 3.

As shown in FIG. 5, the retina board 68 has a pair (only one shown) of rectangular slots 138 provided therein which are adapted to receive portions of L-shaped board holder teeth 140 therethrough. Spring-loaded detent balls (not shown) are provided on board holder 132 below teeth 140. The slots 138 in the board 68 thus cooperate with L-shaped teeth 140 and the spring-loaded detent balls in the board holder 132 to removably position the retina board at a predetermined registry position with the board holder 132 at which roll, yaw and pitch axes AA, BB and CC of the apparatus are positioned approximately at the center point of second linear photosensor array 56.

A top filter holder 150 has a vacuum pocket (not shown) in a face portion thereof adapted to abuttingly engage the rear face of top filter member 70. The top filter holder 150 is mounted on an angle shaft 152. The pocket of top filter holder 150 receives vacuum through a hose from a vacuum source (not shown) through a control valve assembly 272, FIG. 14. The angle shaft 152 is rotatably mounted within an angle shaft support bracket 154 for rotational movement about a top filter pitch axis DD which extends generally parallel to axis CC by angle shaft stepper 156. The top filter holder and angle shaft are constructed and arranged such that axis DD lies within the plane of the outermost reflective layer of the filter member. Unlike axis CC, axis DD is fixed during the adjustment process.

An angle shaft slide 158 and associated cylinder unit 160 are mounted on a structure fixedly associated with the main base plate 110. That structure includes first and second vertically extending side plates 162, 164, a laterally extending top plate 166 fixedly attached to the side plates, and a laterally extending mid plate 168 which is also attached to the two side plates. Cylinder unit 160 provides adjustment during setup of the apparatus 100 but is not used during the filter member/photosensor unit adjustment process.

Figure 6:
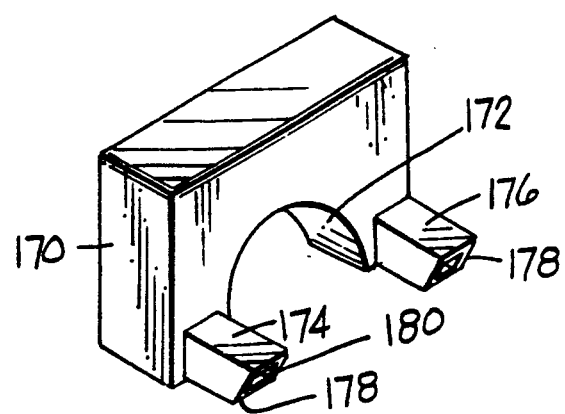
FIG. 6 is a perspective view of a tooth block of the apparatus of FIG. 3.
Figure 7:
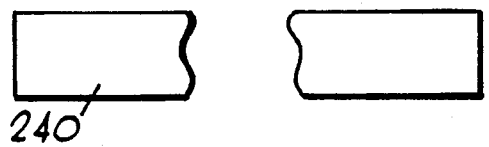
FIG. 7 is a normal view of a white target provided on a face of a rotor block of the apparatus of FIG. 3.
Figure 8:
FIG. 8 is a normal view of a coarse X-MTF target provided on a face of a rotor block of the apparatus of FIG. 3.
Figure 9:
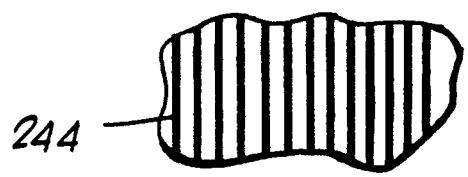
FIG. 9 is a substantially enlarged normal view of a fine X-MTF target provided on a face of a rotor block of the apparatus of FIG. 3.
Figure 10:
FIG. 10 is a normal view of a 45° target provided on a face of a rotor block of the apparatus of FIG. 3.

A tooth block 170, as best illustrated in FIG. 6, is adapted to removably hold the bottom filter member 80 in fixed relationship therewith during the adjustment process. The tooth block 170 has a half-cylinder-shaped passage 172 extending longitudinally therethrough and has a pair of longitudinally extending teeth 174, 176 which each have coplanar inclined face surfaces 178 and vacuum ports 180 provided at terminal end portions thereof. The face surfaces 178 of tooth block 170 lie in a plane extending laterally, parallel to top filter pitch axis DD. The bottom filter member is adapted to abuttingly engage the inclined faces 178 of the tooth block at the front surface thereof and is held against surfaces 178 by vacuum ports 180 during the adjustment operations performed by apparatus 100. The vacuum ports 180 are operably connected to a vacuum supply source (not shown) through a suitable control valve assembly 272, FIG. 14. The tooth block is mounted on a slide assembly 182 supported by top plate 166. Slide assembly 182 enables longitudinal displacement of the tooth block relative to plate 166 (parallel to lens axis LL) by a tooth block cylinder 184. However, cylinder 184 is used only during initial setup of apparatus 100 and is not used during the filter member/sensor unit alignment process.

Lens assembly 50, FIG. 5, is fixedly attached as by adhesive to a V-block 186 at the surface of a V-groove provided therein. A lens base member 188 is fixedly mounted relative to base plate 110 on mid plate 168. A lens slide plate 190 is attached to V-block 186 and is longitudinally displaceably mounted on base plate 188 for movement parallel to lens axis LL by associated lens stepper motor 192.

Figure 3:
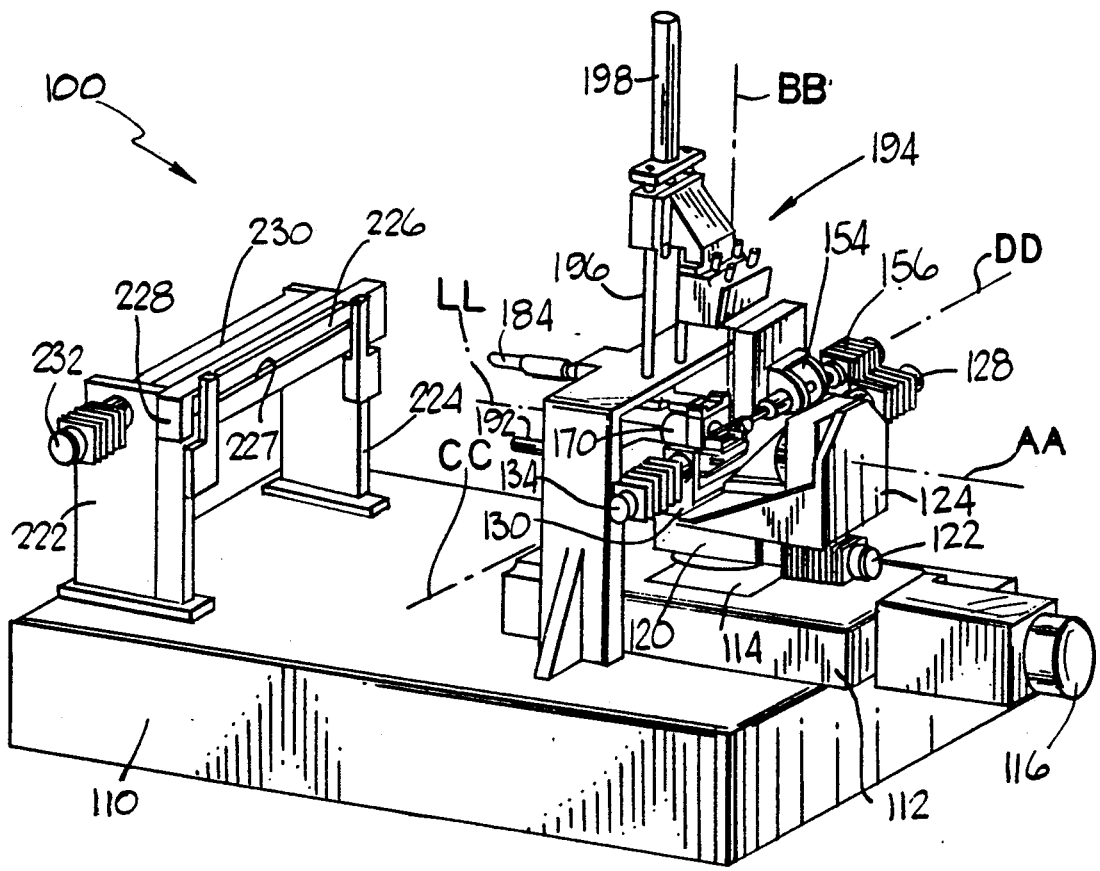
FIG. 3 is a perspective view of an apparatus for assembling filter member and photosensor components of a color optical scanner subassembly.
Figure 4:
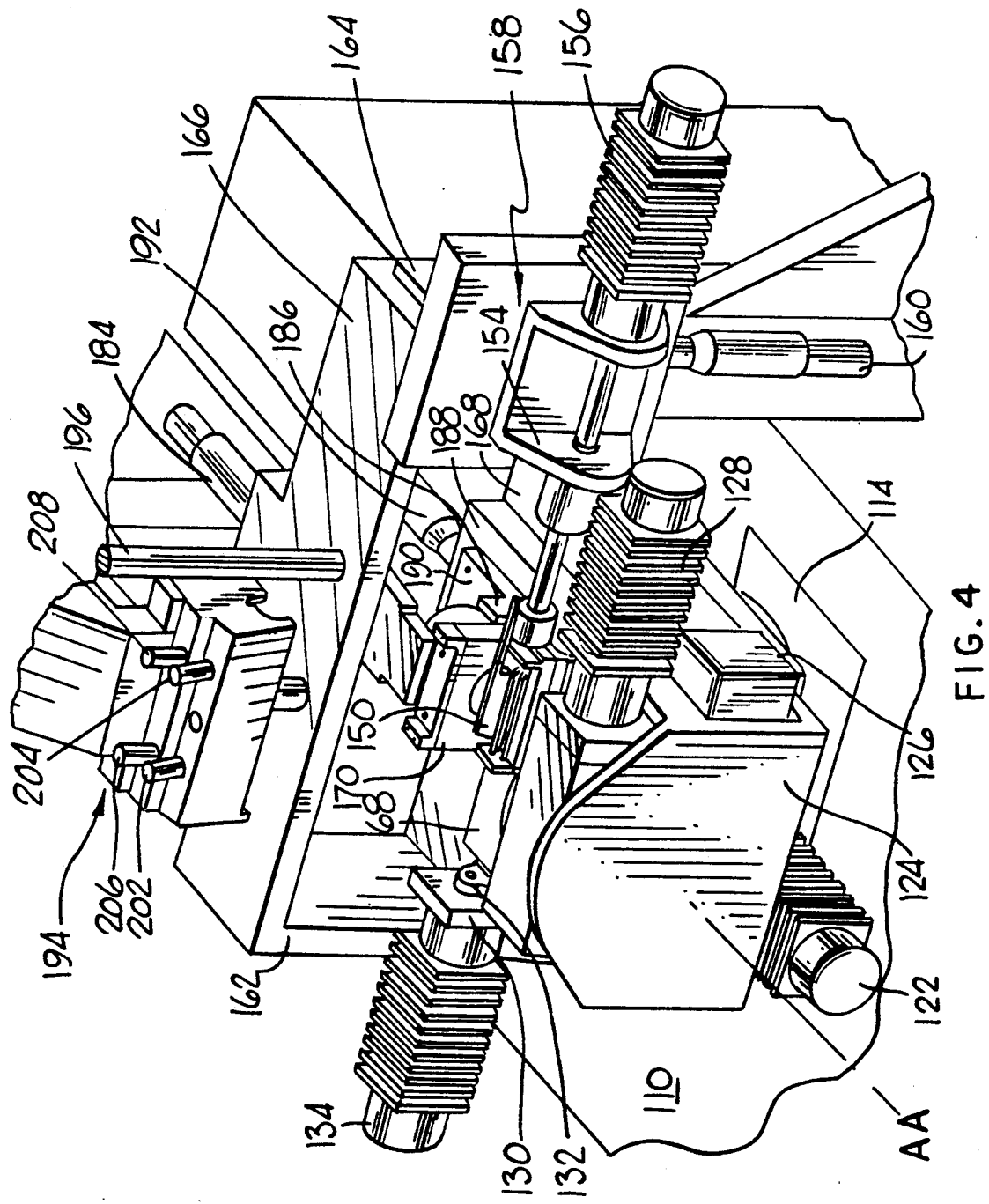
FIG. 4 is a detail perspective view of the apparatus of FIG. 3.

A cover assembly 194, FIGS. 3 and 4, is used to cover the beam splitter and optical sensor assembly 51 for blocking out ambient light during the various adjustment processes performed by apparatus 100. The cover assembly 194 is mounted on guide rails 196 and is displaced up and down therealong by a cylinder assembly 198. Fiber optic cable ports 202, 204, 206, 208 are provided in the cover assembly for receiving fiber optic cables (not shown) which are connected to a UV light source 260, FIG. 14. The ports 202, 204, 206, 208 are constructed and arranged such that the UV light provided through the associated fiber optic cables is directed to small areas on assembly 51 which include the end portions of each of the two filter members. The cables are used for the purpose of providing curing light to cure UV-curable adhesive provided on the filter members at the end of the adjustment process.

First and second vertical rotor support blocks 222, 224 are fixedly mounted on main base plate 110. An aperture plate (field stop) 226 having a line image defining aperture slit 227 therein is fixedly attached between the support blocks 222, 224 opposite from a lamp assembly 228 (which may be identical to the lamp assembly described in Boyd, U.S. Pat. No. 4,926,041). Lamp assembly 228 is also supported by blocks 222, 224. An octagonal rotor 230 which is rotated by stepper motor 232 is rotatably mounted between the two blocks 222, 224 and comprises four separate target faces: a white target face 240, FIG. 7; an X-MTF coarse target 242, FIG. 8, having eight line pairs per inch provided thereon; an X-MTF fine target 244, FIG. 9, having 105 lines pairs per inch provided thereon; and a 45° target 246, FIG. 10, having four line pairs per inch provided thereon, and fine Y-MTF having lines inclined at an angle of approximately 2.5° and having 105 line pairs per inch.

From the above description it will be appreciated that, during the adjustment process, the photosensor unit 52 (and attached support member 60 and circuit board 68) are longitudinally translationally displaceable relative the base member 110 in a direction parallel to lens axis LL. Photosensor unit 52 is also rotationally displaceable with respect to base member 110 about roll, yaw and pitch axes AA, BB and CC which intersect at the center of the photosensor unit center line array 56. Top filter member 70 is displaceable relative base member 110 only rotationally about lateral axis DD during the adjustment process. Bottom filter member 80 remains stationary relative base 110 during the adjustment process.

FIG. 14 is a schematic illustration of a computer control assembly and the various components of apparatus 100 which are controlled thereby. A digital computer 250, which may comprise a conventional personal computer, such as a 386 or 486 processor based machine, is connected through controller board 67 and retina board 68 to the outputs of the three linear sensor arrays of photosensor unit 52. The computer 250 is also connected by conventional interface circuitry 251 to conventional position or "home" sensors 133, 153, 143 associated with the board holder 132, angle shaft 152, and slide plate 190. The home sensors provide absolute reference signals used at system startup to zero out encoder units associated with the pitch, angle shaft, and lens stepper motors. The computer is connected by conventional stepper motor control circuitry 253 to encoders (not shown) associated with each stepper motor. The signals from the encoders indicate the relative displacement of each motor shaft. Computer 250 uses data output by the linear photosensor arrays, home sensors, stepper motor encoders, and predetermined control algorithms to determine the needed displacement of various components of apparatus 100 for properly aligning the two filter assemblies 70, 80 with the three-line photosensor unit 52.

After needed displacements are determined, the computer issues appropriate control commands via stepper motor controller 253 to actuate stepper motors 116, 122, 128, 134, 156, 192 and 232 for accomplishing the needed displacements.

The computer 250 also sends commands via appropriate interface circuitry 251 to control valve assembly 272 to provide air to cover cylinder 198 to lower the cover and raise the cover at the beginning and the end of the adjustment process. The computer 250 also issues control commands to control valve assembly 272 to supply a vacuum to the top filter holder 150 and the tooth block 170 at the beginning of an adjustment process and further issues commands thereto at the end of the process to terminate the vacuum.

The computer 250 is connected to lamp assembly 228 via controller board 67 and lamp driver unit 227. The computer issues a command to energize lamp assembly 228 at the beginning of the adjustment process to provide imaging light to the photosensor unit 52. The computer is also connected to UV lamp assembly 260. The computer issues a control command to UV lamp assembly 260 to open a lamp shutter for a predetermined period of time at the end of the adjustment process to facilitate curing of adhesive.

INITIATING OPERATION OF THE APPARATUS

To initiate operation of the adjustment apparatus, an operator places computer 250 in an automatic adjustment start mode.

An operator responding to a prompt on the computer display initially places an assembly including retina board 68, support member 60, and three-line photosensor unit 52 into registration with board holder 132. At this time, board holder 132 may be in a relatively retracted position within the apparatus 100 which enables easy insertion of the retina board, etc. Next, the operator provides an input to the computer indicating that the retina board has been mounted in the apparatus 100, and the computer in response issues a command to translation motor 116 causing it to displace the translation slide 114 and apparatus components supported thereon forwardly, i.e. in a direction parallel to axis LL and towards rotor 230. The translation slide moves forwardly to a predetermined position whereat the linear photosensor arrays 54, 56, 58 are in nominal registration with color component images 53, 55, 57 of the white target projected by lens assembly 50. At the same time, the computer issues commands to the pitch, roll, yaw, and top filter and lens stepper motors to place the various motion assemblies of the apparatus 100 in an initial predetermined nominal registration position. The computer also energizes lamp assembly 228 via controller board 67 and a conventional lamp driver unit 227, controller board 67, and retina board 68. The computer 250 then sends a control command to open vacuum valves in valve assembly 270 so as to provide vacuum to top filter holder 50 and tooth block 170. The computer also sends a command to rotor motor 232 to position the rotor 230 with the white target 240 in alignment with aperture plate 226.

Figure 11:
FIG. 11 is a substantially enlarged normal view of a fine Y-MTF target provided on a face of a rotor block of the apparatus of FIG. 3.
Figure 12:
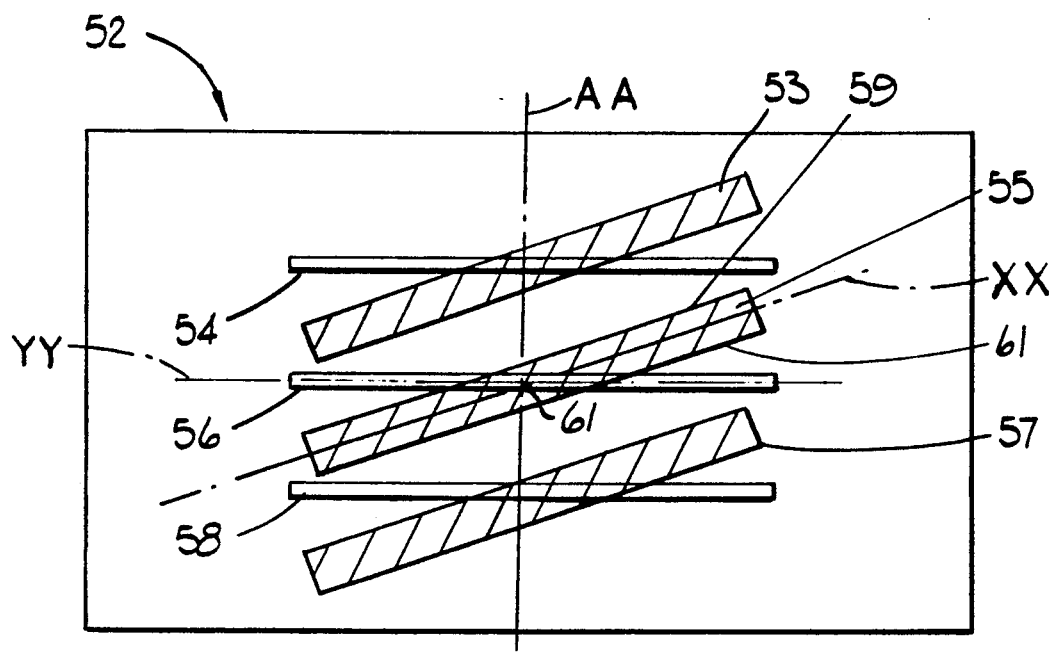
FIG. 12 is a top plan view of a three-line photosensor unit with color component images projected thereon in skewed relationship therewith.

The operator, responding to another computer prompt, then places the top and bottom filter members into registration position with the top filter holder 150 and tooth block 170, respectively. Vacuum holds the filter members 70, 80 in place. Once the filter members are in place, the operator provides an input so indicating to the computer, and the computer issues a command to cover cylinder 198 causing it to lower cover assembly 194 into covering relationship with the filter members and photosensor unit 52. The cover assembly blocks light other than that passing through the lens assembly 50 from reaching the photosensor unit 52. The lamp assembly 228 of the apparatus 100 having been energized by the computer causes color component line images 53, 55, 57 of the white target 240 to be projected onto the three-line photosensor unit 52, FIG. 11. At this stage of the adjustment process, the color component line images 53, 55, 57 are in merely nominal alignment, focus, etc. with the associated linear sensor arrays 54, 56, 58.

PHYSICAL REGISTRATION ADJUSTMENT

The first portion of the adjustment process performed by apparatus 100 places the line images in physical registration with the linear photosensor arrays. "Physical registration" as used herein means placing the images in parallel alignment with the sensor arrays, adjusting the spacing between images to that of the sensor arrays, and centering each image on an associated array. The first stage of physical registration coarsely aligns, i.e. corrects the skew between, the linear photosensor arrays and the line images projected by the lens assembly 50, see FIG. 11. Initially, the translation motor 116 is actuated by the computer to move the photosensor assembly back and forth longitudinally by calculated incremental amounts based upon retina board output until the position of one of the two outer edges 59, 61 of each of the three-line images 53, 55, 57 is detected. The outer edge of a line image is defined as a point having a light intensity which is a preset fraction, e.g. ⅜, of the maximum light intensity of the image. After the position of one edge of each line image is determined, calculations are performed based upon the geometric relationship of the line images with the linear photosensor arrays to determine the width of each of the images, the spacing between images, and the skew angle which exists between the images and the linear photosensor arrays. Based upon the calculated skew angle, the computer issues a command to yaw stage motor 122 to rotate the yaw stage about axis BB a predetermined amount to bring the linear sensor arrays into approximate parallel alignment with the line images. At this point, "coarse" photosensor alignment has been achieved.

Next, adjustment begins for achieving "fine" photosensor alignment with the line images. To achieve fine alignment, the translation motor 116 is actuated by the computer to move the translation slide 114 incrementally until an edge portion 59 of the center line image 55 is sensed at the middle pixel element 61 of the center linear photosensor array 56. Next, the skew is adjusted by operation of the yaw motor to provide equal signal magnitude at the two ends of the center sensor. Next, the translation slide motor is actuated to move the central pixel 61 of linear array 56 to the middle, i.e. the central axis XX of the center line image 55. The center line image 55 is now precisely aligned with and centered on the center linear sensor array 56, i.e. image central axis XX is now coaxial with sensor central axis YY.

FOCUS SYMMETRY ADJUSTMENT

Next, focus symmetry adjustment is performed. Initially, the computer sends a command to the rotor motor to position the coarse X-MTF target opposite the aperture plate so as to project color component line images of that target onto photosensor unit 52. The relative amount of X-MTF focus which has been achieved at the center pixel of the center linear array 56 is then calculated by the computer based upon the data signal from the photosensor unit using focus algorithms. Based upon the calculated X-MTF at the center pixel 61 of array 56, the computer issues a command to lens stepper motor 192 to move the lens assembly 50 to a coarsely focused position relative pixel 61. Next, the relative X-MTF focus at the pixels at each end of the center linear array 56 is calculated, and, based upon this calculation, the computer issues a command to the roll motor 128 to angularly displace the photosensor unit 52 about roll axis AA to bring the end portions, and thus the entire linear array 56, into coarse X-MTF focus. After coarse X-MTF focus has been thus achieved, the same process is repeated using an image projected by the fine X-MTF target so as to achieve fine X-MTF focus adjustment.

Next, Y-MTF focus is adjusted. The computer issues a command to the rotor motor to position the Y-MTF target in alignment with the aperture plate so as to project a line image of the fine Y-MTF target 248 onto the photosensor unit 52. Y-MTF focus is then calculated using focus algorithms. Based upon the calculated Y-MTF focus, the computer actuates the roll motor 128 to angularly displace the photosensor unit 52 about roll axis AA to achieve proper Y-MTF focus.

COLOR REGISTRATION ADJUSTMENT

Next, color registration error is determined and corrected. The computer issues a command to the rotor motor to align the coarse X-MTF target with the aperture plate, and the image projected thereby is detected by the photosensor arrays. In order for "X" color registration to be achieved, it is necessary that each of the color component line images of an object be provided at the same relative lateral position on each of the linear photosensor arrays, e.g. if in line image 53 the image portion corresponding to a particular one of the vertical lines on the X-MTF target lies on pixel position #6 of linear array 54, then the image portion of that particular vertical line provided in line image 55 should also be positioned at pixel position #6 on linear sensor 56, image 57 should also have a corresponding image portion located at pixel position #6 on sensor 58. The computer compares the pixel position of each X-MTF target portion on each of the linear photosensor arrays to determine if color registration has been achieved. The pixel position of an image on an outer array, e.g. 54, may be relatively adjusted with respect to the pixel position of an image on the center array by rotation of the photosensor unit 52 about pitch axis CC. Thus, if color registration error is sensed, the computer issues a control command to the pitch motor 134 to rotate unit 52 a small preset amount in the proper direction to correct the color registration error. This result is tested and the above operation is repeated until correction within a predetermined value is determined.

"Y" color registration error is next calculated using the 45° target 246. "Y" color registration error is detected by calculating the color registration error and subtracting out the "X" component which was previously calculated. "Y" color registration error may be corrected by rotation of the top filter member an appropriate amount about axis DD. Thus, after determining the amount of "Y" color registration error, the computer issues a control command to motor 156 to produce the necessary amount of rotation of the top filter member to correct the error.

ADJUSTMENT PROCESS COMPLETION

Figure 13:
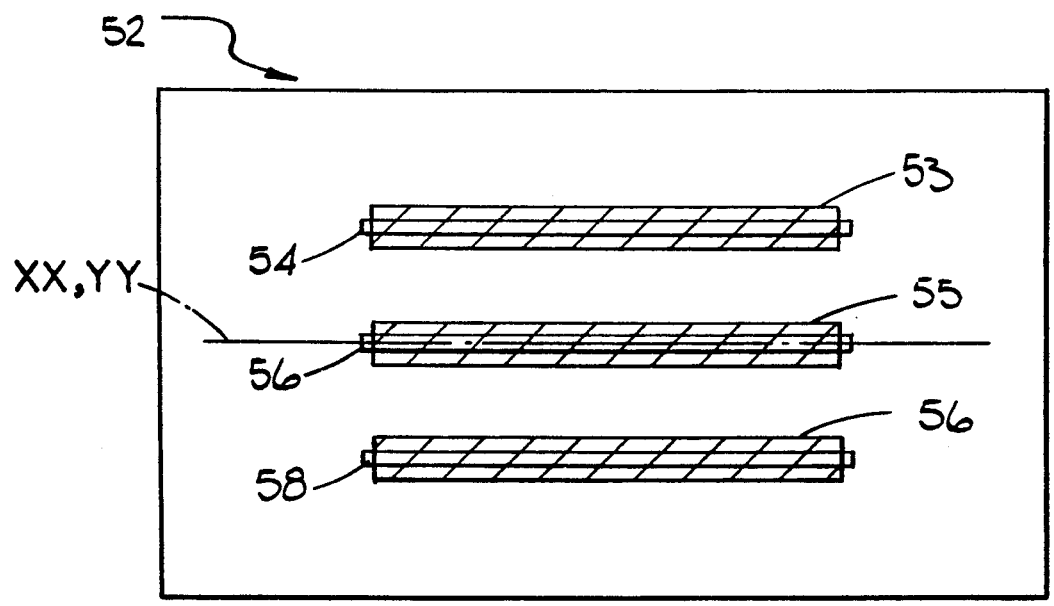
FIG. 13 is a top plan view of a three-line photosensor unit with color component images projected thereon in properly registered relationship therewith.

The correction of color registration error completes the position adjustment process performed by apparatus 100. At the end of the position adjustment process, the computer raises the hood and prompts the operator to apply adhesive drops to the ends of the filter members and support member wings. The operator then enters a signal to the computer which lowers the hood. the computer next issues a command to energize UV lamp 260, FIG. 13, for a predetermined period of time. Ultraviolet light is directed from the lamp through fiber optic cables attached to the cover unit at 202, 204, 206, 208, and onto the area of the filter members where the UV curing adhesive has been applied. Curing fixedly bonds the filter members 70, 80 to the support member 60.

After curing is completed, the adjustments are reverified and the computer issues a command to cover cylinder unit 198 causing it to raise the cover assembly 194. The computer next issues a command to translation motor 116 causing it to displace the translation plate and structure mounted thereon rearwardly to the original starting position. The retina board and attached structural member 60, photosensor unit 52, and filter members 70, 80 may then be hand-removed from the apparatus 100. At this point, a new retina board 68/support member 60/photosensor unit 52 assembly may be mounted in the apparatus 100, and a new adjustment operation may commence.

Appendix A which forms a part of the disclosure of this patent application is a pseudocode listing for software which may be used by a computer 250 to actuate an apparatus 100 to perform the adjustment operations described herein.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

APPENDIX A

FILTER BOND TOOL PSUEDO CODE

```
Main Program
{

Initialize the computer display device

Trap system interupts by the program

Define the system motors:
            Lens Focus
            Target
            Mtf Symmetry
            X Color Separation
            Skew
            Slot Translate
            Y Color Separation Define a Scanner Initialize all global parameters and communications.

Create the main program window with pulldown menus for:
        Automatic Mode
        Maintenance
        Initialize
        system button for exiting program
    Do
    {
       act upon user response (subroutine Next_Message())
    } until user response is exit
```

Cleanup and return all memory to the system

Exit
}

Automatic Mode
{
  Create the automatic mode window:
        Text area for program status
        Text area for operator messages
        Continue button (when activated this calls Next_Message)
        Text windows for board serial number, top and side filter lot numbers
        Display ON/OFF button to control frequency of plot data (toggles)
        Graph area for displaying plots
        System button for exiting to main menu Display step 1 Loading instructions and status
  Turn off power to retina board
  Raise ccd cover
  Unclamp retina board clamp
  release vacuum from top and side filter holders
  move motors to parts loading position:
        Slot Translate
        Y Color Registration
        X Color Registration
        Skew
        Mtf Symmetry
  Initialize Display ON/OFF button
  Set global variable step = 2    note:  step is the state machine control
                                         used by Next_Message for sequencing
                                         through the operator interactions
}

Next_Message
{
  switch (step)
  {
      case 1: note: this is the starting condition for each board, also
                    done at startup of the automatic mode Raise ccd cover
                Unclamp retina board clamp
                release vacuum from top and side filter holders
                move motors to parts loading position:
                        Slot Translate
                        Y Color Registration
                        X Color Registration
                        Skew
                        Mtf Symmetry
                Turn power off to retina board
                Clear retina serial number field
                step = 2;
                Display Step 1 Loading instructions and status
                break;

case 2:
                Test for presence of board serial number and filter lot numbers
                        and exit with error message if any are missing.
                Power on to the retina board
                Turn on the retina board clamp
                update global variables from the serial and lot number fields
                move motors to adjustment start positions

```
            X Color Registration
            Skew
            Mtf Symmetry
            Lens Focus
            Slot Translate
            Turn on vacuum clamp for top filter
            if(not able to communicate with scanner)
            {
              Power off to retina board
              Display communication error message and status
            }
            else
            {
              Turn on lamp
              set rotate count = 0
              set step = 3
              Display load top filter message and status
            }
            break;

case 3:
        Turn On side filter vacuum
        step = 4
        Display load side filter message and status
        break;

case 4:
        Display automatic adjustment message

Remove CONTINUE button from window
        Lower ccd cover
        move X Color Separation motor to starting position
           (in case it moved by operator)
        Change status to Align Slot
        result = align_slot()
        if(result < 0)
        {
          Display Slot Error Message
          raise ccd cover for operator access to parts
          move motors to adjustment starting positions
                Skew
                Mtf Symmetry
                Slot Translate
          Put CONTINUE button back into window
          break;
        }
        Change status to Lamp Adjust
        lamp_adjust() - get lamp into prnu correctable range
        Change status to Fine Focus
        result = fine_focus()
        if(result < 0)
        {
          Display Fine Focus Error Message
          Raise the ccd cover for operator access to parts
          move motors to adjust starting positions
                Skew
                MTF Symmetry
                Slot Translate
          Put CONTINUE button back into window
          break;
        }
```

```
Change status to Color Registration Adjust
result = adj_color_reg()
if(result < 0)
{
  Raise ccd cover for operator access to parts
  if (result == -2)
  {
    Display Lost Slot during color separation adjustment
      error msg
    Raise ccd cover for operator access to parts
    Move Slot Translate motor to adjust starting position
  }
  else
  {
    if (rotate count == 0)
    {
      Display First Filter Flip Error Message
      rotate count = 1;
    }
    else
    {
      if (rotate count == 1)
      {
        Display Second Filter Flip Error Message
        rotate count = 2;
      }
      else
      {
        if (rotate == 2)
        {
          rotate count = 0;
          Display Change Filters Message
        }
      }
    }
  }
  Put CONTINUE button back into window
  break;
}
lamp_adjust() - get lamp into prnu correctable range
result = test_result() - test color separation and mtf
Put CONTINUE button back into window
if(result < 0)
{
  step = 4
  Display Verification Error Message
}
else
{
  Raise ccd cover for operator access for adhesive application
  Display Apply Adhesive Message
  step = 5;
}
break;

case 5:
    lower ccd cover
    result = lamp_adjust  (adjust lamp for prnu correction)
    if(result == 0) result = test_result() (verify adjustment)
    if(result < 0)
```

```
            {
              raise ccd cover
              Display Failure to Verify Message
            }
            else
            {
              Change status to Adhesive Cure
              Remove CONTINUE button from window
              Turn on uv lamps
              Wait 1 minute for adhesive cure
              Turn off uv lamps
              lamp_adjust()
              save process data
              result = test_result() (test completed retina board)
              raise the ccd cover
              release vacuum to both top and side filters
              turn off power to retina board
              step = 1;

if(result < 0) display Failed Verification Message
              else display Board Passed Message put the CONTINUE button back into the window
              update the motor position configuration file
            }
          break;

}
}
```

ALIGN SLOT THEORY

When the slot is aligned with the sensing arrays the three bands of light created by the color separation filters will illuminate the three sensing arrays. Missalignment of the slot can create the following sets of characteristics.

1. The board has little or no rotation in the horizontal plane but is translated along the optical axis resulting in one of the following.
   A. The red or blue array is not illuminated but the other two arrays are illuminated.
   B. Only the red or blue array is illuminated.
   C. All three arrays are illuminated (transation close to 0)
   D. None of the arrays illuminated.

2. The board has rotation in the horizontal plane sufficient that a sensing array will not be illuminated along its full length by a single band of light. A single band of light may illuminate portions of all three sensing arrays. This results in a square wave effect for each color with up to three peaks in the wave. (*note: need a picture here) The square waves for the colors are offset from each other resulting that there will be one and only one peak that will simultaneously have all three colors present. When this wave is in the center of the scan then the translation component of the board is correct. Rotation will now bring each array into complete illumination.

The adjustment process is to move the board along the optical axis until there is an area in which all three colors have an amplitude peak. Then center this area in the scan and then rotate the board to illuminate all three sensing arrays completely. If no array has any illumination a binary search pattern is used to find some place where there is illumination. Care must be taken that the search pattern does not use step sizes which will allow the illumination bands to always fall in between the sensing arrays.
Once some illumination is present the colors present and absent tell which
direction to translate and approximately how far to go. Once all three
colors are present then the position in the scan and the width of the
peak give information on which direction to go and how far to go. After
the peak is centered the width is adjusted to a predetermined width from
which a known rotation will provide illumination of the entire array.

Once all three arrays are completely illuminated the board is slowly
translated to the point where the illumination is reduced to 2/3 of its
starting value, indicating that the edge of the light band is on the
sensing array. Now a fine rotation adjustment may be made to get a balanced
illumination of the array with the edge of the light band. Now the board is
translated to the center of the light band by knowing the width of the light
band and knowing that the edge is currently on the sensors.

```
align_slot()
{
  Select all white target for scanning
  while(slot is not aligned)
  {
    while (any color doesn't exceed 50 someplace in scan)
    {
      scan the target
      set p[color] = 1 if peak value for that color > 50 else set to 0.
      find the first and last pixel where all three colors exceed 50 the following steps translate board until all three colors peak value
      exceeds 50 if(p[_GREEN] == 0)
                    {
                      if(p[_RED] == 1)
                      {
                              steps = 40;
                              _slot_xlate->set_direction("-");
                      }
                      else
                      {
                              if(p[_BLUE] == 1)
                              {
                                      steps = 40;
                                      _slot_xlate->set_direction("+");
                              }                         else
                              {
                                      steps = 30;
                                      _slot_xlate->set_direction("+");
                              }
                      }
                    } // end if p[_GREEN] == 0
                    else
                    {
                      if(p[_RED] == 0)
                      {
                              steps = 20;
                              _slot_xlate->set_direction("+");
                      }
                      else
                      {
                              if(p[_BLUE] == 0)
                              {
                                      steps = 20;
                                      _slot_xlate->set_direction("-");
```

```
                    }
                    else
                    {
                            all three colors  > 50
                    }
            }
        } // end else p[_GREEN] == 1
        if(not all three colors > 50)
        {
           if(_slot_xlate->get_location() > xlate_max ||
                _slot_xlate->get_location() < xlate_min )
           {
                   return -1; ERROR, slot couldn't be found
           }
           _slot_xlate->move(steps);
           _slot_xlate->wait_for_stop();
        }
    }
       all colors now > 50 somewhere in scan
       now adjust skew so all points between 200 and 3400 > 50 if( first == 200 && last == 3400) skew is adjusted;
else adjust skew with the following steps direction = 1;
        _skew->set_direction("+");

while(skew not adjusted)
        {
                if(first == 200)
                {
                  if(last == 3400) skew is adjusted;
                  else
                  {
                          if (last - first > 2200)
                          {
                                  _skew->move(10L);
                                  _skew->wait_for_stop();
                          }
                          else
                          {
                                  _slot_xlate->set_direction("+");
                                  steps = 7L;
                          }
                  }
                }
                else
                {
                  if(last == 3400)
                  {
                          if (last - first > 2200)
                          {
                                  _skew->move(10L);
                                  _skew->wait_for_stop();
                          }
                          else
                          {
                                  _slot_xlate->set_direction("-");
                                  steps = 9L;
                          }
                  }
                  else
                  {
```

```
                if(last - first < 700) last = first + 700;
                steps = (long)(((3600 -last - first)*7)/(last - first));
                if( steps < 0)
                {
                        steps = -steps;
                        _slot_xlate->set_direction("-");
                }
                else
                        _slot_xlate->set_direction("+");

if (last - first < 2400)
                   {
                        _skew->move(20L);
                        _skew->wait_for_stop();
                   }
                   else
                   {
                        _skew->move(10L);
                        _skew->wait_for_stop();
                   }
                }
             }
             if(skew not adjusted)
             {
                if(steps > 30) steps = 30;
                _slot_xlate->move(steps);
                _slot_xlate->wait_for_stop();

scan the image find first and last pixels where all three colors exceed 50 if(owidth > last - first)
                        {
                                if(direction < 0)
                                {
                                   direction = 1;
                                   _skew->set_direction("+");
                                }
                                else
                                {
                                   direction = -1;
                                   _skew->set_direction("-");
                                }
                        }
                        owidth = last - first;

if(not all colors peak value > 50) go back and fix it;
                }
         } skew is now adjusted
      } slot is now alligned
      center_slot()
} center_slot()
   { scan the image
      find the average illumination of the 10 center pixels
      set desired edge value = to 2/3 of the average value found
      set board translate direction to negative
      now find the edge of the slot using 2 step increments
```

```
while (edge of slot not found)
{
  move the slot two steps in selected direction
  scan the image
  find the average illimination of the 10 center pixels
  if(average value found < desired edge value) edge of slot is found
}
now find edge again using 1 step increments
set board translate direction to positive
while (edge of slot not found)
{
  move the slot one step in selected direction
  scan the image
  find the average illimination of the 10 center pixels
  if(average value found >= desired edge value) edge of slot is found
} now adjust skew for equal right and left side brightness +- 8 counts scan the image
find the average brightness for 10 pixels on left, center and right if(left - right < 0) set skew direction negative
else set skew direction positive if(abs(left - right) < 8) skew is adjusted
else skew is not adjusted
set skew steps = 4
while(skew not adjusted)
{
  move skew steps
  scan the image
  find the average brightness for 10 pixels on left, center and right
  if(center average < desired edge value) translate 1 step positive
  if(center average > desired edge value) translate 1 step negative
  if(left - right < 0)
  {
    if(skew direction positive)
    {
      set skew direction negative
      if(skew steps = 4) set skew steps = 1
      else skew is adjusted
    }
  }
  else
  {
    if(direction negative)
    {
      set skew direction negative
      if(skew steps = 4) set skew steps = 1
      else skew is adjusted
    }
  }
  if(abs(left - right) < 8) skew is adjusted
} now move to center of slot
set translate direction positive
translate 7 steps (slot is 14 steps wide)
}
```

```
int test_result()
{
  set uncorrected scan
  move target to white target
  set corrected scan
  move target to coarse X MTF target
  scan image into coarse_data
  move target to fortyfive degree target
  scan image into fortyfive_data
  color_reg( coarse_data, fortyfive_data, xcolorsep_err, ycolorsep_err);
  find the minimum x registration error for red-to-green or blue-to-green
  find the maximum x registration error for red-to-green or blue-to-green
  if(minn < 60 || maxx > 196) return with an error flag find the minimum y registration error for red-to-green or blue-to-green
  find the maximum y registration error for red-to-green or blue-to-green
  if(minn < 60 || maxx > 196) return with an error flag
  else return with no error
} int adj_color_reg()
{
  set uncorrected scan
  move target to white target
  set corrected scan
  move target to coarse X MTF target
  scan image into coarse_data
  move target to fortyfive degree target
  scan image into fortyfive_data
  color_reg( coarse_data, fortyfive_data, xcolorsep_err, ycolorsep_err);
  set x color registration direction to null
  while(x registration not adjusted)
  {
    find the minimum x registration error for red-to-green or blue-to-green
      with the location of the minimum
    find the maximum x registration error for red-to-green or blue-to-green
      with the location of the maximum if (x color registration adjustment at limit of motion)
    {
      if(minimum < 64 || maximum > 192) return with error
      else x color registration adjust done
    }
    else
    {
      if(minimum is closer to limit)
      {
        if(minimum location less than center pixel)
        {
        if(x color registration direction is positive)
          stop x adjustment, test result
        else set x registration direction negative
        }
        else
        {
          if(x color registration direction is negative)
            stop x adjustment, test result
          else set x registration direction positive
        }
      }
      else
      {
        if(minimum is closer to limit)
```

```
    {
      if(maximum location is less than center pixel
      {
        if(x color registration direction is positive)
          stop x adjustment, test result
        else set x registration direction negative
      }
      else
      {
        if(x color registration direction is negative)
          stop x adjustment, test result
        else set x registration direction positive
      }
    }
    else
    {
      if(minn < 64 || maxx > 192)
      result = -1;
      done = 1;
      }
      else  done = 2;   // go to y color reg test
    }
  }
  if(adjustment stopped to test result)
  {
    if(minimum < 64 || maximum > 192) return error
    else x color registration adjustment complete
  }
  if(x color registration adjustment not complete)
  {
    move x color registration 10 steps in set direction
    move target to coarse X MTF target
    scan image to coarse_data
    move target to fortyfive degree target
    scan image to fortyfive_data
    color_reg( coarse_data, fortyfive_data, xcolorsep_err, ycolorsep_err)
  }
 }
} // end x color reg adjust while (y color registration adjust not complete)
{
  move x color registration 10 steps in set direction
  move target to coarse X MTF target
  scan image to coarse_data
  move target to fortyfive degree target
  scan image to fortyfive_data
  color_reg( coarse_data, fortyfive_data, xcolorsep_err, ycolorsep_err)

find the minimum y registration error for red-to-green or blue-to-green
  find the maximum y registration error for red-to-green or blue-to-green if(minimum to maximum range greater than 2 pixels) return with error
  else
  {
    steps = (maximum + minimum)/2 -128;
    if(steps < 0)
    {
      set y registration adjust direction positive
      set board translate direction positive
      make steps positive
```

```
    }
    else
    {
      if (steps > 0)
      {
        set y registration direction negative
        set board translate direction positive
      }
    }
  }
}
if(steps < 5) y registration adjust complete
if(y registration adjust not complete)
{
  if(steps > 60) steps = 60
  move y color registration calculated number of steps
  lamp_adjust()
  {
    set scanner for uncorrected scan
    move target to white target
    set lamp duty cycle to 30
    turn on lamp with new duty cycle
    while(lamp not adjusted)
    {
      scan the image
      find the peak scan value
      if(peak value > 116)
      {
        if(duty cycle = 22) lamp is adjusted
        else
        {
          reduce duty cycle by (peak - 116)
          if(duty cycle < 22) duty cycle = 22
          turn on lamp with new duty cycle
        }
      }
      else
      {
        if (peak value < 108)
        {
          if (peak value < 60)
          {
            if(lamp duty cycle > 40) exit with error, something is wrong
            else
            {
              increase duty cycle by 5
              turn on lamp with new duty cycle
            }
          }
          else
          {
            increase duty cycle by (108 - peak)
            turn on lamp with new duty cycle
          }
        }
        else lamp is adjusted
      }
      else lamp is adjusted
    }
  }
}
translate board calculated number of steps
slotres = align_slot();
if (slotres < 0)
```

```
    {
        set error code to -2
        y registration adjust is complete
    }
    else
    lamp_adjust();
    fine_focus();
    }
  }
  return error code
}
```

What is claimed is:

1. An apparatus for assembling components of a color optical scanner subassembly which includes a first filter member, a second filter member and a photosensor unit comprising:
   a) imaging means for impinging an imaging light beam from a line object onto said first and second filter assemblies for producing spatially separated color component images of said line object on said photosensor unit;
   b) physical adjustment means for holding and selectively adjusting the relative position of said first filter member, said second filter member and said photosensor unit in response to data signals generated by said photosensor unit for accurately locating said filter members relative to said photosensor unit for optimizing performance of the color optical scanner.

2. The invention of claim 1 wherein said physical adjustment means comprises:
   mechanical means for relatively spatially displacing said filter members and said photosensor unit and
   data processing means for processing said data signal from said photosensor unit and issuing control commands to said mechanical means in response thereto.

3. The invention of claim 1 wherein said imaging means comprises:
   lens displacement means for relatively displacing a lens portion of said imaging means along a lens axis with respect to said photosensor unit for adjusting the focus of said color component images on said photosensor unit.

4. The invention of claim 2 wherein said physical adjustment means comprises means for placing said color component images of a line object in accurate registry with linear photosensor arrays on said photosensor unit.

5. The invention of claim 4 wherein said means for placing said color component images of a line object in accurate registry with coplanar linear photosensor arrays on said photosensor unit comprises:
   longitudinal axis translation means for linearly displacing said photosensor unit along a longitudinal translation axis of said apparatus oriented generally perpendicular to the direction of extension of said linear photosensor arrays on said photosensor unit;
   photosensor yaw axis rotation means supported on said translation means for pivotally displacing said photosensor means about a yaw axis extending perpendicular to the plane of said coplanar linear photosensor arrays and generally perpendicular to said longitudinal translation axis; and
   second filter lateral axis rotation means for pivotally displacing said second filter member about a lateral axis fixedly positioned relative said longitudinal translation axis and extending perpendicular thereto.

6. The invention of claim 4 wherein said means for placing said color component images of a line object in accurate registry with coplanar linear photosensor arrays on said photosensor unit comprises:
   longitudinal axis translation means for linearly displacing said photosensor unit along a longitudinal translation axis of said apparatus oriented generally perpendicular to the direction of extension of said linear photosensor arrays on said photosensor unit.

7. The invention of claim 4 wherein said means for placing said color component images of a line object in accurate registry with coplanar linear photosensor arrays on said photosensor unit comprises:
   photosensor yaw axis rotation means supported on said translation means for pivotally displacing said photosensor means about a yaw axis extending perpendicular to the plane of said coplanar linear photosensor arrays and generally perpendicular to said longitudinal translation axis.

8. The invention of claim 4 wherein said means for placing said color component images of a line object in accurate registry with coplanar linear photosensor arrays on said photosensor unit comprises:
   second filter lateral axis rotation means for pivotally displacing said second filter member about a lateral axis fixedly positioned relative said longitudinal translation axis and extending perpendicular thereto.

9. The invention of claim 1 wherein said physical adjustment means comprises means for adjusting the focus symmetry of said color component images.

10. The invention of claim 9 wherein said means for adjusting the focus symmetry of said color component images comprises:
    photosensor roll axis rotation means for pivotally displacing said photosensor means about a photosensor roll axis coplanar with said coplanar linear photosensor arrays, and perpendicular to said arrays.

11. The invention of claim 1 wherein said physical adjustment means comprises means for adjusting color registration of said color component images with said linear photosensor arrays.

12. The invention of claim 11 wherein said means for adjusting color registration of said color component images with said linear photosensor arrays comprises:
    photosensor pitch axis rotation means for pivotally displacing said photosensor means about a photosensor pitch axis extending in the plane of said coplanar linear photosensor arrays, and parallel to said arrays; and second filter lateral axis rotation means for pivotally displacing said second filter member about a lateral axis extending generally parallel to said photosensor pitch axis.

13. The invention of claim 11 wherein said means for adjusting color registration of said color component images with said linear photosensor arrays comprises:
photosensor pitch axis rotation means for pivotally displacing said photosensor means about a photosensor pitch axis extending in the plane of said coplanar linear photosensor arrays, and parallel to said arrays.

14. The invention of claim 11 wherein said means for adjusting color registration of said color component images with said linear photosensor arrays comprises:
second filter lateral axis rotation means for pivotally displacing said second filter member about a lateral axis.

15. The invention of claim 1 wherein said physical adjustment means comprises:
a) means for placing said color component images of a line object in accurate registry with linear photosensor arrays on said photosensor unit comprising:
i) longitudinal axis translation means for linearly displacing said photosensor unit along a longitudinal translation axis of said apparatus oriented generally perpendicular to the direction of extension of said linear photosensor arrays on said photosensor unit;
ii) photosensor yaw axis rotation means supported on said translation means for pivotally displacing said photosensor means about a yaw axis extending perpendicular to the plane of said coplanar linear photosensor arrays and generally perpendicular to said longitudinal translation axis; and
iii) second filter lateral axis rotation means for pivotally displacing said second filter member about a lateral axis fixedly positioned relative said longitudinal translation axis and extending perpendicular thereto;
b) means for adjusting the focus symmetry of said color component images comprising photosensor roll axis rotation means for pivotally displacing said photosensor means about a photosensor roll axis coplanar with said coplanar linear photosensor arrays, and perpendicular to said arrays and said photosensor yaw axis;
c) means for adjusting color registration of said color component images with said linear photosensor arrays comprising:
i) said photosensor pitch axis rotation means; and
ii) said second filter lateral axis rotation means.

16. A method for adjusting the relationship between components of a color optical scanner subassembly comprising first and second laterally extending composite filter members and a photosensor unit having a plurality of parallel, laterally extending, linear photosensor arrays provided in a common image plane thereon, prior to assembly of the optical scanner, comprising the steps of:
positioning the composite filter members and photosensor unit in nominal operational alignment;
operably connecting the photosensor arrays to a computer adapted to receive and process data signals therefrom;
impinging an imaging light beam of a line object onto said first filter member at an orientation so as to impinge separated component beams onto said second filter member and so as to project color component line images onto said photosensor array;
relatively displacing the first and second laterally extending composite filter members and photosensor unit based upon commands generated by the computer in response to the data signals received from said photosensor arrays.

17. The method of claim 16 wherein the step of relatively displacing the first and second laterally extending composite filter members and photosensor unit comprises the steps of:
a) placing color component images of a line object projected onto said photosensor unit in physical registry with linear photosensor arrays on said photosensor unit;
b) adjusting the focus symmetry of said color component images along the length of said linear photosensor arrays;
c) adjusting color registration of said color component images with said linear photosensor arrays.

* * * * *